US010735549B2

(12) United States Patent
Fujishiro et al.

(10) Patent No.: US 10,735,549 B2
(45) Date of Patent: Aug. 4, 2020

(54) NETWORK APPARATUS

(71) Applicant: KYOCERA CORPORATION, Kyoto (JP)

(72) Inventors: Masato Fujishiro, Yokohama (JP); Katsuhiro Mitsui, Ritto (JP); Kugo Morita, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/140,204

(22) Filed: Sep. 24, 2018

(65) Prior Publication Data
US 2019/0028563 A1 Jan. 24, 2019

Related U.S. Application Data

(63) Continuation of application No. PCT/JP2017/011813, filed on Mar. 23, 2017.

(30) Foreign Application Priority Data

Mar. 31, 2016 (JP) .................................. 2016-071519

(51) Int. Cl.
*H04L 29/08* (2006.01)
*H04L 29/06* (2006.01)
(Continued)

(52) U.S. Cl.
CPC .......... *H04L 67/2847* (2013.01); *G06F 13/00* (2013.01); *H04L 67/2842* (2013.01);
(Continued)

(58) Field of Classification Search
CPC ............. H04L 67/2847; H04L 67/2842; H04L 69/163; H04W 76/22; H04W 76/11;
(Continued)

(56) References Cited

U.S. PATENT DOCUMENTS

2001/0039197 A1* 11/2001 Barkan .................... H04M 1/00
2002/0058537 A1* 5/2002 Bhatoolaul ............. H04M 1/00
(Continued)

FOREIGN PATENT DOCUMENTS

JP 2000-276425 A 10/2000
JP 2006-246421 A 9/2006
(Continued)

OTHER PUBLICATIONS

CMCC; "Study on Context Aware Service Delivery in RAN for LTE", 3GPP TSG RAN Meeting #71; RP-160633; Mar. 7-10, 2016; Göteborg, Sweden.

*Primary Examiner* — Ronald B Abelson
(74) *Attorney, Agent, or Firm* — Studebaker & Brackette PC

(57) ABSTRACT

A network apparatus according to one embodiment is provided in a radio access network of a mobile communication system. The network apparatus comprises: a storage configured to store content data delivered from a server outside the radio access network; and a controller configured to recognize content data requested by a radio terminal, and to determine whether or not the requested content data is stored in the storage. The controller is configured to, when the requested content data is stored in the storage, deliver the requested content data to the radio terminal on behalf of the server.

1 Claim, 10 Drawing Sheets

(51) Int. Cl.
*H04W 4/00* (2018.01)
*H04W 28/14* (2009.01)
*H04W 88/18* (2009.01)
*H04W 76/22* (2018.01)
*H04W 76/11* (2018.01)
*H04W 76/27* (2018.01)
*H04W 88/12* (2009.01)
*H04W 88/16* (2009.01)
*H04W 92/20* (2009.01)
*H04W 36/00* (2009.01)
*H04W 80/06* (2009.01)
*G06F 13/00* (2006.01)

(52) U.S. Cl.
CPC ............ *H04L 69/163* (2013.01); *H04W 4/00* (2013.01); *H04W 28/14* (2013.01); *H04W 76/11* (2018.02); *H04W 76/22* (2018.02); *H04W 76/27* (2018.02); *H04W 88/12* (2013.01); *H04W 88/16* (2013.01); *H04W 88/18* (2013.01); *H04W 36/0072* (2013.01); *H04W 80/06* (2013.01); *H04W 92/20* (2013.01)

(58) Field of Classification Search
CPC ....... H04W 76/27; H04W 4/00; H04W 28/14; H04W 88/12; H04W 88/16; H04W 88/18
See application file for complete search history.

(56) References Cited

U.S. PATENT DOCUMENTS

| | | | |
|---|---|---|---|
| 2005/0132049 | A1 | 6/2005 | Inoue et al. |
| 2006/0056421 | A1* | 3/2006 | Zaki ........................ H04L 12/56 |
| 2009/0291696 | A1* | 11/2009 | Cortes ...................... H04Q 7/20 |
| 2010/0027507 | A1* | 2/2010 | Li .......................... H04W 36/00 |
| 2012/0271904 | A1 | 10/2012 | Black et al. |
| 2014/0064083 | A1* | 3/2014 | Ray ........................ H04W 28/08 |
| 2014/0153504 | A1 | 6/2014 | Wang et al. |
| 2014/0169164 | A1 | 6/2014 | Oguchi |
| 2014/0226602 | A1* | 8/2014 | Zakrzewski .......... H04W 72/04 |
| 2014/0342712 | A1 | 11/2014 | Madhavan et al. |
| 2015/0281997 | A1 | 10/2015 | Kojima et al. |
| 2015/0327306 | A1* | 11/2015 | Oostveen .............. H04W 76/02 |

FOREIGN PATENT DOCUMENTS

| | | |
|---|---|---|
| JP | 2013-048327 A | 3/2013 |
| JP | 2014-120925 A | 6/2014 |
| JP | 2014-519636 A | 8/2014 |
| JP | 2014-528205 A | 10/2014 |
| JP | 2015-523017 A | 8/2015 |
| JP | 2015-188267 A | 10/2015 |
| JP | 2015-195559 A | 11/2015 |

\* cited by examiner

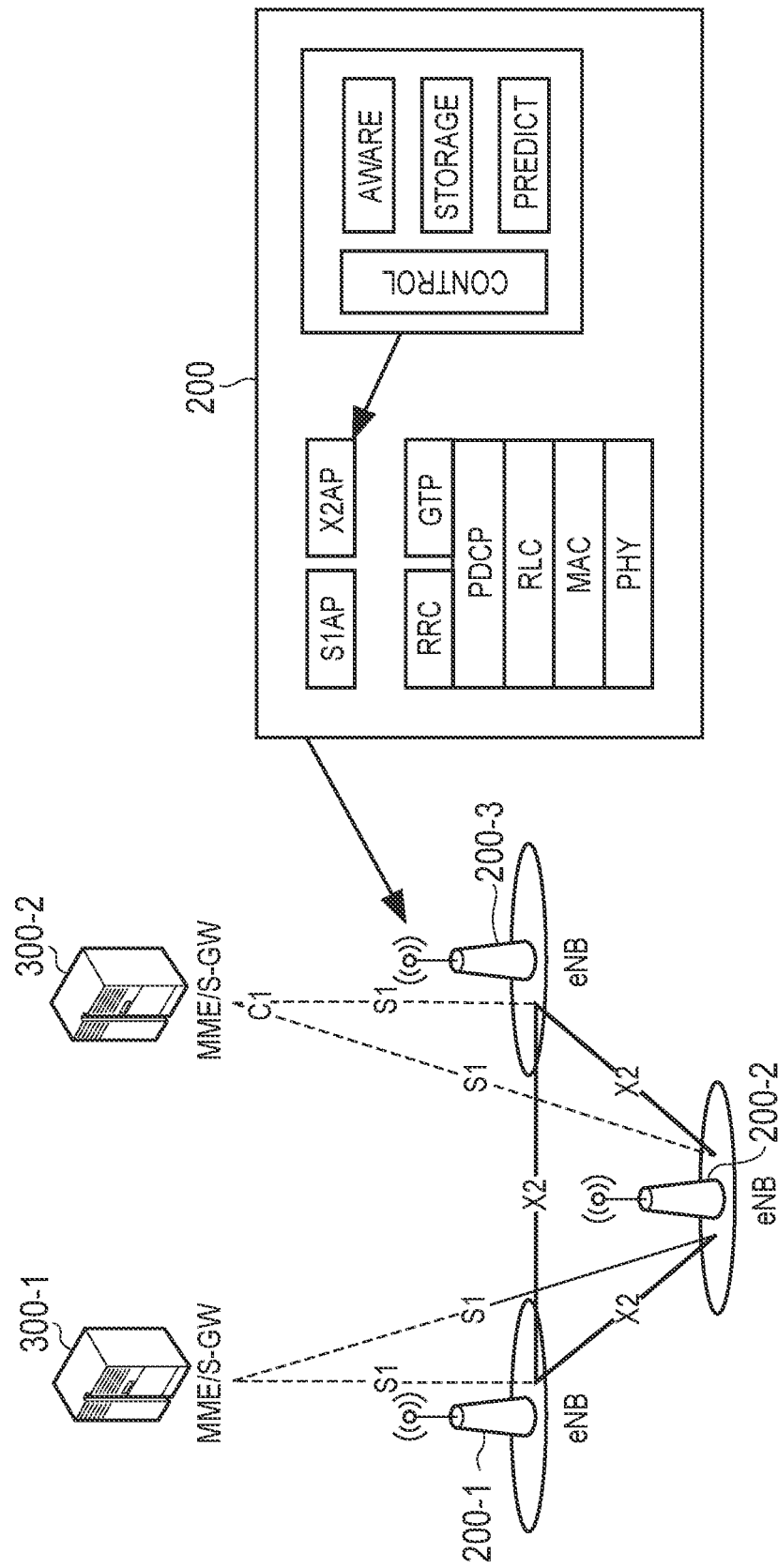

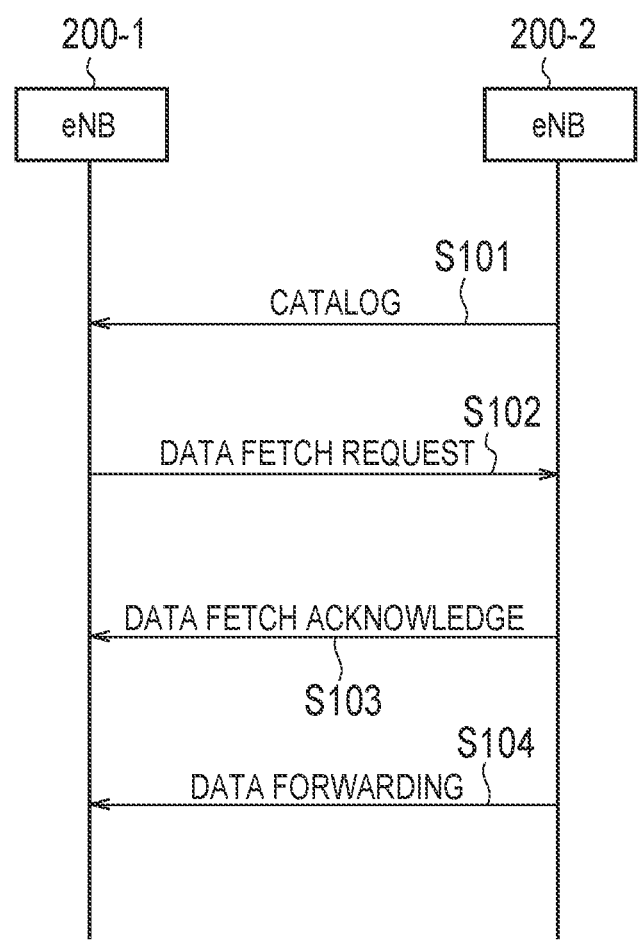

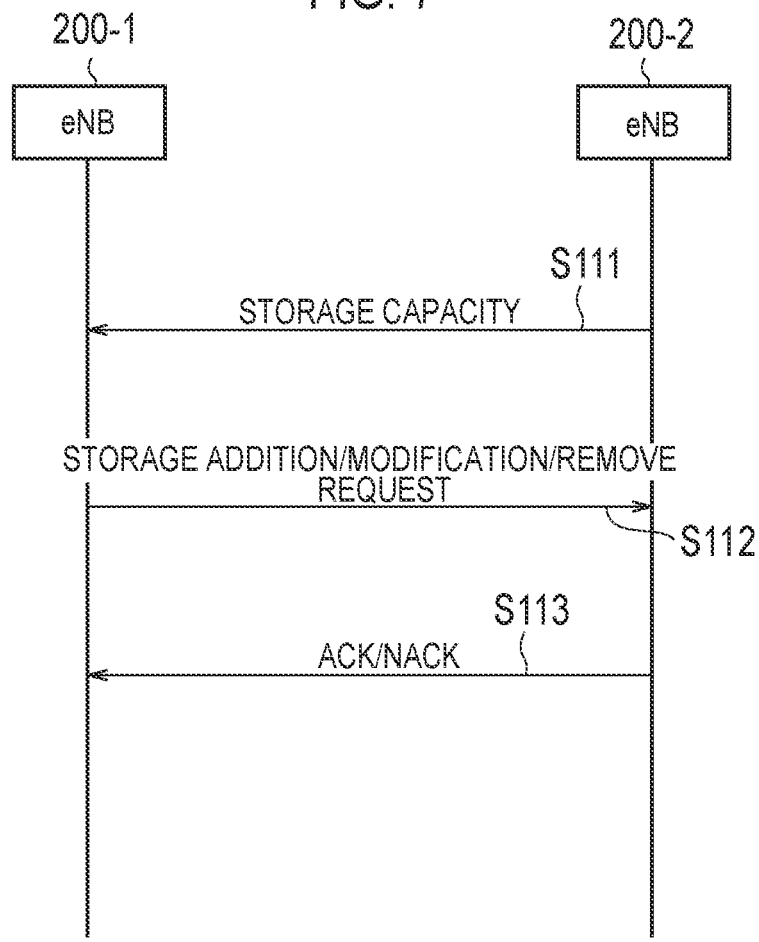
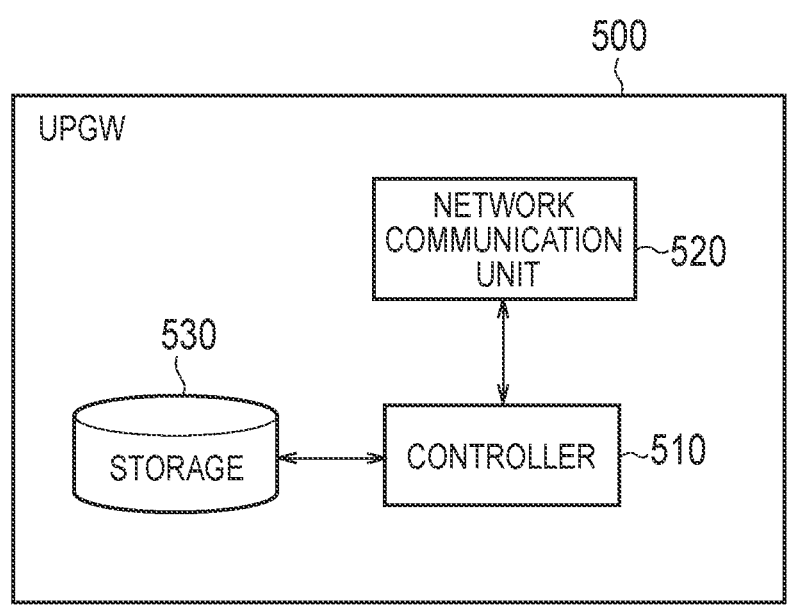

NETWORK APPARATUS

CROSS-REFERENCE TO RELATED APPLICATION

The present application is a continuation based on PCT Application No. PCT/JP2017/011813 filed on Mar. 23, 2017, which claims the benefit of Japanese Patent Application No. 2016-071519 (filed on Mar. 31, 2016). The content of which is incorporated by reference herein in their entirety.

FIELD

The present disclosure relates to a network apparatus used in a mobile communication system.

BACKGROUND

In a mobile communication system, a radio terminal receives data (user data) transmitted from a communication destination via a radio access network (RAN). The communication destination of the radio terminal is, for example, a server or the like on the Internet. In such a data forwarding, from the viewpoint of a high-level layer equal to or higher than an IP (Internet Protocol) layer, the RAN is transparent to handling of data of the user plane (U-plane).

On the other hand, in a fifth generation (5G) mobile communication system, by increasing the RAN in sophistication, a delay time (that is, latency) of data forwarding to a radio terminal (that is, latency) is desirable to be reduced.

PRIOR ART DOCUMENT

Non-Patent Document

Non Patent Document 1: 3GPP Contribution "RP-160633", Mar. 10, 2016

SUMMARY

A network apparatus according to one embodiment is provided in a radio access network of a mobile communication system. The network apparatus comprises: a storage configured to store content data delivered from a server outside the radio access network; and a controller configured to recognize content data requested by a radio terminal, and to determine whether or not the requested content data is stored in the storage. The controller is configured to, when the requested content data is stored in the storage, deliver the requested content data to the radio terminal on behalf of the server.

A network apparatus according to one embodiment is provided in a radio access network of a mobile communication system. The network apparatus comprises: a receiver configured to receive data transmitted from a communication destination of a radio terminal; and a controller configured to store the data, and forward the stored data to the radio terminal. The network apparatus terminates a connection of a predetermined protocol between the radio terminal and the communication destination. Even if the data forwarding is not complete, the controller transmits a delivery acknowledgment response for the data to the communication destination on behalf of the radio terminal.

BRIEF DESCRIPTION OF THE DRAWINGS

FIG. 5 is a diagram illustrating a function of the eNB according to a first embodiment.

FIG. 6 is a diagram illustrating an operation sequence example 1 according to the first embodiment.

FIG. 7 is a diagram illustrating an operation sequence example 2 according to the first embodiment.

FIG. 8 is a diagram illustrating a configuration of a UPGW according to the second embodiment.

DESCRIPTION OF THE EMBODIMENT

Overview of Embodiments

Figure 1:
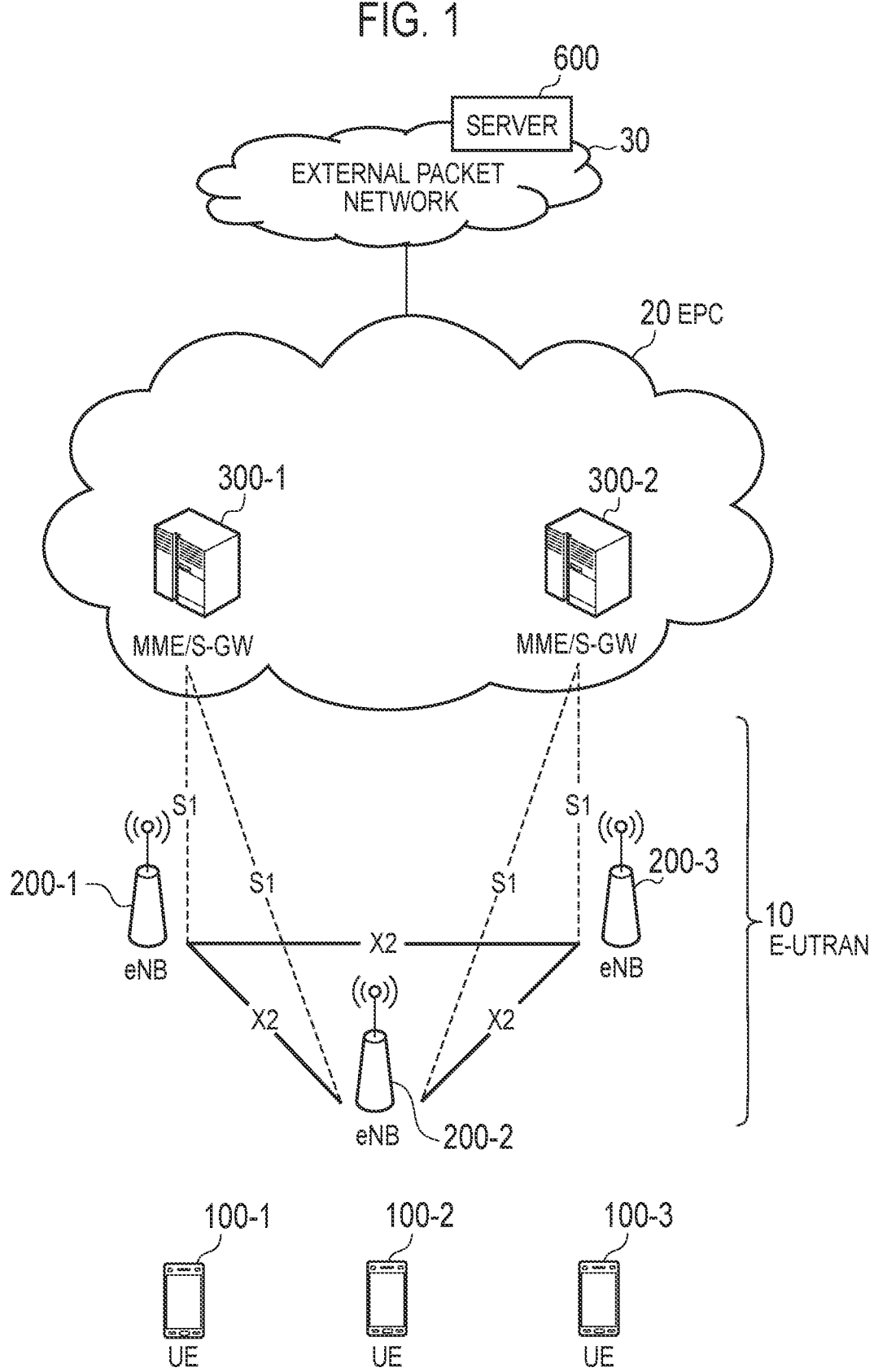
FIG. 1 is a diagram illustrating a configuration of an LTE system.

A network apparatus according to one embodiment is provided in a radio access network of a mobile communication system. The network apparatus comprises: a storage configured to store content data delivered from a server outside the radio access network; and a controller configured to recognize content data requested by a radio terminal, and to determine whether or not the requested content data is stored in the storage. The controller is configured to, when the requested content data is stored in the storage, deliver the requested content data to the radio terminal on behalf of the server.

In one embodiment, the network apparatus is a base station.

In one embodiment, the network apparatus is an apparatus provided on a data path between a base station and a core network.

In one embodiment, the controller is configured to recognize the requested content data, based on uplink data of the radio terminal. The controller is configured to, when the requested content data is not stored in the storage, transfer the uplink data to a core network.

In one embodiment, the network apparatus shares a storage capacity with another network apparatus provided in the radio access network. The controller is configured to exchange information on the storage, via a network interface with the another network apparatus, with the other network apparatus.

In one embodiment, the another network apparatus is a base station.

In one embodiment, the another network apparatus is an apparatus provided on a data path between a base station and a core network.

In one embodiment, the controller is configured to notify the another network apparatus of content data stored in the storage.

In one embodiment, the controller is configured to request the another network apparatus to forward specific content data. The controller is configured to acquire the specific content data forwarded from the another network apparatus.

In one embodiment, the controller is configured to notify the another network apparatus of a capacity of the storage.

In one embodiment, the controller is configured to request at least one of an addition of a shared storage capacity, a modification of a shared storage capacity, and a removal of a shared storage capacity to the another network apparatus.

In one embodiment, the controller is configured to set, with the base station, a bidirectional data path of uplink data and downlink data of the radio terminal, and sets, with the core network, a unidirectional data path of uplink data of the radio terminal.

In one embodiment, the controller is configured to, when a handover of the radio terminal is performed from a source base station to a target base station, receive a path switch request from the source base station. The path switch request includes information on the target base station.

A network apparatus according to one embodiment is provided in a radio access network of a mobile communication system. The network apparatus comprises: a receiver configured to receive data transmitted from a communication destination of a radio terminal; and a controller configured to store the data, and forward the stored data to the radio terminal. The network apparatus terminates a connection of a predetermined protocol between the radio terminal and the communication destination. Even if the data forwarding is not complete, the controller transmits a delivery acknowledgment response for the data to the communication destination on behalf of the radio terminal.

In one embodiment, the predetermined protocol is a TCP. The delivery acknowledgment response is a TCP ACK.

Configuration of Mobile Communication System

Hereinafter, the configuration of the mobile communication system according to the embodiment will be described. FIG. 1 is a diagram showing a configuration of an LTE (Long Term Evolution) system which is a mobile communication system according to the embodiment. The LTE system is a mobile communication system based on the 3rd Generation Partnership Project (3GPP) standard.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell).

The E-UTRAN 10 corresponds to a radio access network (RAN). The E-UTRAN 10 includes a plurality of eNBs (evolved Node-Bs) 200. The eNB 200 corresponds to a base station. The eNBs 200 are connected mutually via an X2 interface.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/ S-GWs (Serving-Gateways) 300. The MME (MME 300 C) performs various mobility controls and the like for the UE 100. The S-GW (S-GW 300U) performs control to transfer data. MME/S-GW 300 is connected to eNB 200 via an S1 interface.

The EPC 20 is connected to an external packet network 30 such as the Internet. The EPC 20 includes a PDN-GW (not shown) located at a connection point with the external packet network 30. The external packet network 30 includes various servers 600. The server 600 distributes content data to the UE 100 using various protocols such as Transmission Control Protocol (TCP), User Datagram Protocol (UDP), Real-time Transport Protocol (RTP), File Transfer Protocol (FTP)

Figure 2:
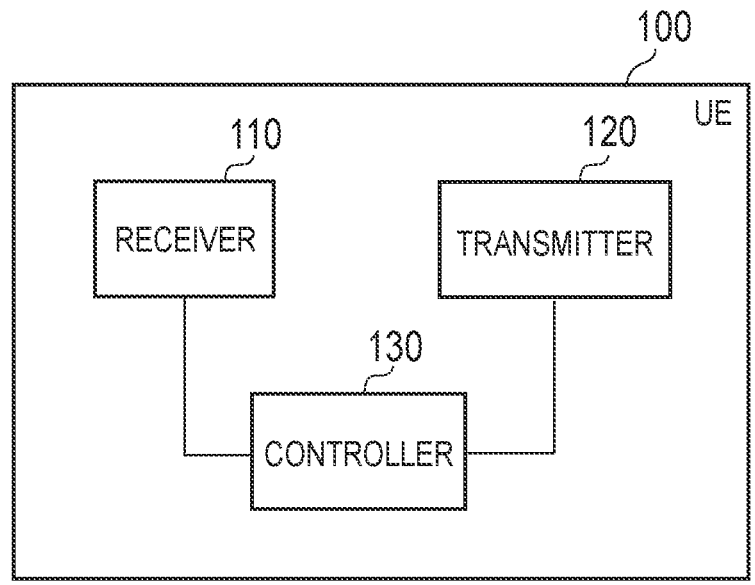
FIG. 2 is a diagram illustrating a configuration of a UE (radio terminal).

FIG. 2 is a diagram of the configuration of UE 100 (radio terminal). As illustrated in FIG. 2, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor may further include a codec that performs encoding and decoding on sound and video data. The processor executes below-described processes.

Figure 3:
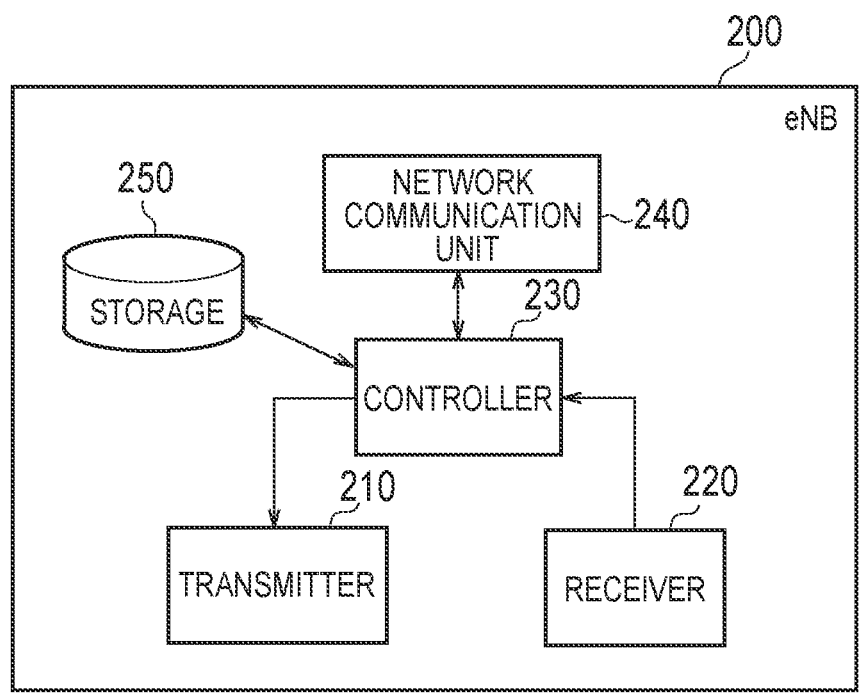
FIG. 3 is a diagram illustrating a configuration of an eNB (base station).

FIG. 3 is a diagram illustrating configuration of the eNB 200 (base station). As illustrated in FIG. 3, the eNB 200 includes: a transmitter 210, a receiver 220, a controller 230, a network communication unit 240 and a storage 250.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor executes below-described processes.

The network communication unit 240 is connected to a neighboring eNB 200 via the X2 interface and is connected to the MME/S-GW 300 via the S1 interface. The network communication unit 240 is used for communication performed on the X2 interface, communication performed on the S1 interface, and the like.

The storage 250 stores various data. Details of the storage 250 will be described later.

Figure 4:
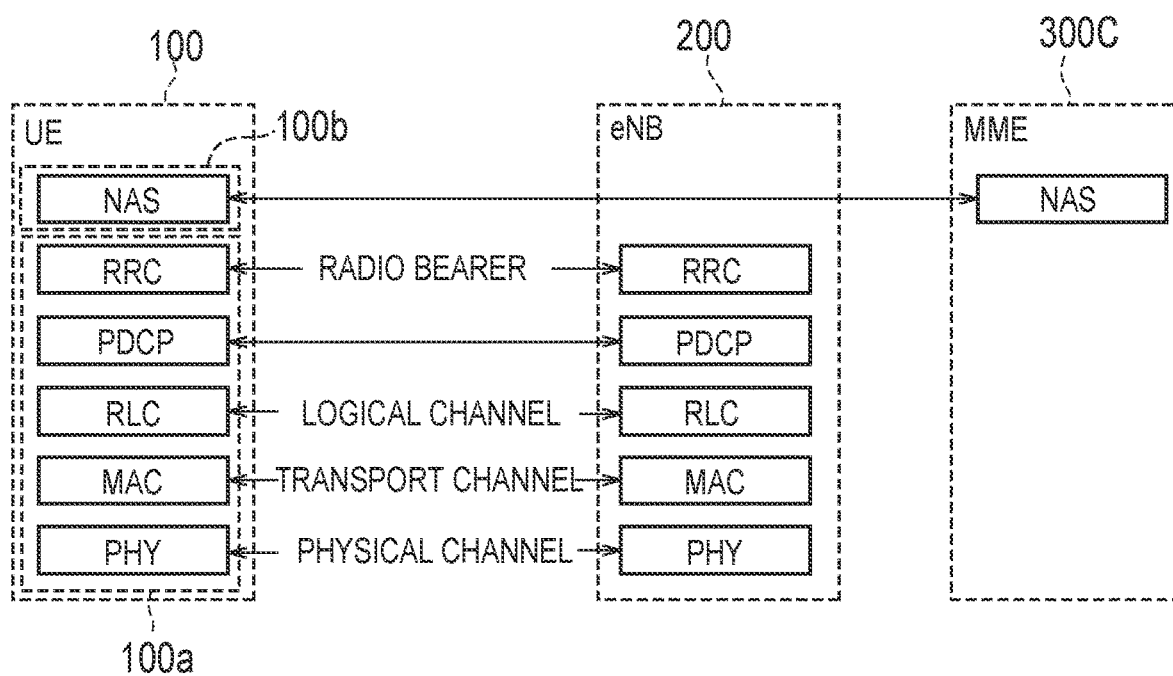
FIG. 4 is a diagram illustrating a configuration of a protocol stack of a radio interface in the LTE system.

FIG. 4 is a diagram illustrating protocol stack of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The physical layer, the MAC layer, the RLC layer, the PDCP layer, and the RRC layer constitute an AS (Access Stratum) layer entity 100a. The upper layer entity 100b is positioned higher than the AS layer entity 100a. The upper layer entity 100b includes an NAS (Non-Access Stratum) layer. The upper layer entity 100b may further include an application layer or the like.

The PHY layer performs encoding and decoding, modulation and demodulation, antenna mapping and demapping, and resource mapping and demapping. Between the PHY layer of the UE 100 and the PHY layer of the eNB 200, data and control information are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control information are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control information are transmitted via a logical channel.

The PDCP layer performs header compression and decompression, and encryption and decryption.

The RRC layer is defined only in a control plane dealing with control information. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

First Embodiment

A first embodiment will be described below.

A network apparatus according to the first embodiment is a device provided in a radio access network (E-UTRAN 10) of a mobile communication system. In the first embodiment, the network apparatus 30 is the eNB 200.

The eNB 200 includes the storage 250 configured to store content data delivered from the server 600 outside the E-UTRAN 10, and the controller 230 configured to recognize content data requested by the UE 100, and to determine whether or not the requested content data is stored in the storage 250. If the requested content data is stored in the storage 250, the controller 230 delivers the requested content data to the UE 100 on behalf of the server 600.

In this way, the eNB 200 that is physically close to the UE 100 directly delivers the content data to the UE 100. As a result, the content data can be delivered to the UE 100 without passing through the external packet network 30 and the EPC 20. Therefore, it is possible to reduce latency of data forwarding to the UE 100. Further, it is possible to reduce traffic load in the EPC 20 and the external packet network 30.

In the first embodiment, the eNB 200 (the controller 230) recognizes requested content data, based on uplink data of the UE 100. If the requested content data is not stored in the storage 250, the eNB 200 transfers the uplink data to the EPC 20 (S-GW 300U).

Thus, the eNB 200, by interpreting the content data request included in the uplink data transmitted from the UE 100, recognizes the content data requested by the UE 100. If the eNB 200 does not have the requested content data, the content data is delivered to the UE 100 from the server 600 by transferring the uplink data to the EPC 20 (S-GW 300U). Therefore, even if the eNB 200 does not have the requested content data, the delivery of the content data to the UE 100 is guaranteed.

The eNB 200 shares the storage capacity with another network apparatus provided in the E-UTRAN 10. In the first embodiment, another eNB 200 is the other network apparatus. However, the other network apparatus may be a gateway device provided on the data path between the eNB 200 and the EPC 20 (S-GW 300U). Such a gateway device will be described in a second embodiment. In the first embodiment, an example in which one eNB (eNB 200-1) shares the storage capacity with another eNB (eNB 200-2) will be described.

Thus, by virtually integrating the storage 250 of each eNB 200, one virtual large-capacity storage can be constructed by using a plurality of eNBs 200. In the first embodiment, a case is assumed in which a plurality of eNBs 200 construct such a virtual large-capacity storage in an autonomous distributed manner. However, the virtual large-capacity storage may be constructed under the control of OAM (Operations Administration Maintenance).

Each eNB 200 (controller 230) exchanges information on the storage 250 with another eNB via a network interface. The network interface is an X2 interface. Alternatively, the network interface may be an S1 interface. In the first embodiment, an example in which one eNB (eNB 200-1) performs an exchange with another eNB (eNB 200-2) on the X2 interface will be described.

FIG. 5 is a diagram illustrating a function of the eNB 200 according to the first embodiment. The function of the eNB 200 illustrated in FIG. 5 is executed by the controller 230 (and the storage 250).

As illustrated in FIG. 5, the eNB 200 executes a protocol of the network interface in addition to a protocol stack of the radio interface (see FIG. 4). The protocol of the network interface includes a GTP (GPRS Tunneling Protocol), an S1AP (S1 Application Protocol), and an X2AP (X2 Application Protocol).

The X2AP (or the S1AP) includes an "Aware entity" for recognizing the requested content data of the UE 100, a "Storage entity" for storing the content data, a "Predict entity" for predicting the content data to be stored, and a "Control entity" for controlling these entities. Specifically, based on the uplink data transmitted from the UE 100, the Aware entity recognizes the requested content data of the UE 100. For example, the Aware entity recognizes the requested content data, based on the content identification information (such as the IP address or URL) included in the uplink data. The content identification information may include a port number. The Aware entity may recognize (estimate) the requested content data by also taking into consideration the preference of a pre-registered user (user preference) and/or the location information of the UE 100. The Storage entity stores (caches) content data delivered from the server 600. The Predict entity predicts content data to be stored (cached). The content data to be stored is, for example, content data popular among users. The Predict entity may predict content data to be stored, based on the statistical information, etc.

The Control entity (the controller 230) forwards the content data stored in the Storage entity (the storage 250) on the X2 interface (or the S1 interface) to another eNB 200. Further, the Control entity (the controller 230) notifies what content data is stored in the Storage Entity (the storage 250) to another eNB 200. In addition, the Control entity (the controller 230) requests another eNB 200 to forward specific content data, and acquires specific content data forwarded from the other eNB 200.

The Control entity (the controller 230) may notify another eNB 200 of the capacity of the Storage entity (the storage 250). Further, the Control entity (the controller 230) may request at least one of an addition of a shared storage capacity, a modification of a shared storage capacity, and a removal of a shared storage capacity to another eNB 200.

FIG. 6 is a diagram illustrating an operation sequence example 1 according to the first embodiment. FIG. 7 is a diagram illustrating an operation sequence example 2 according to the first embodiment. In FIG. 6 and FIG. 7, signaling between the eNBs 200 is transmitted and received on the X2 interface. However, the signaling may be performed on the S1 interface via the MME 300C. The signaling is not associated with a specific UE 100 (Non UE-associated signaling). However, the signaling may be associated with a specific UE 100 (UE-associated signaling).

The operation sequence example 1 illustrated in FIG. 6 is a sequence for forwarding the content data between the eNBs 200.

As illustrated in FIG. 6, in step S101, the eNB 200-2 notifies the eNB 200-1 of a list (Catalog) of content data stored by the eNB 200-2. The list (Catalog) includes identification information of the content data. The identification information is, for example, an IP address, a URL or the like. The eNB 200-1 acquires what content data the eNB 200-2 has stored, based on the list (Catalog). The eNB 200-1 may create a table listing the data storage locations, based on the information, or may create a routing table of a UL (content request signal), or may manage the storage data of the eNB 200-1 (for example, delete the duplicate data, and acquire the insufficient data from the server). It is noted that step S101 may be performed in response to a request from the eNB 200-1, or may be performed periodically at set intervals.

In step S102, the eNB 200-1 transmits, to the eNB 200-2, a "Data Fetch Request" for requesting another eNB 200 to forward specific content data. The Data Fetch Request may have at least one of the following information elements.

1) A transmission-source eNB identifier and/or a destination eNB identifier, a transaction identifier.
2) A list of GTP tunnel endpoints (TEs) of the transmission-source eNB. Each entry in the list may include a TNL (Transport Network Layer) address and a GTP TE ID.
3) A list of the identification information (the IP address, the URL, etc.) of the requested content data.

In step S103, the eNB 200-2 transmits, to the eNB 200-1, a "Data Fetch Acknowledge" for accepting the request of the eNB 200-1. It is noted that if the eNB 200-2 denies the request of the eNB 200-1, the eNB 200-2 may transmit a "Data Fetch Nack/Failure" to the eNB 200-1. These messages may have at least one of the following information elements.

1) A transmission-source eNB identifier and/or a destination eNB identifier, a transaction identifier.
2) A list of GTP tunnel endpoints (TEs) of the transmission-source eNB. Each entry in the list may include a TNL address and a GTP TE ID.

It is noted that step S103 is not mandatory, and may be omitted.

In step S104, the eNB 200-2 forwards, to the eNB 200-1, the content data requested by the eNB 200-1 (Data Forwarding).

The operation sequence example 2 illustrated in FIG. 7 is a sequence for constructing a virtual (shared) storage area between the eNBs 200. It is noted that some of the steps illustrated in FIG. 7 may be integrated with some of the steps illustrated in FIG. 6.

As illustrated in FIG. 7, in step S111, the eNB 200-2 notifies the eNB 200-1 of a "Storage Capacity" that includes information about the storage capacity of the eNB 200-2. The eNB 200-1 acquires the storage capacity and the like of the eNB 200-2, based on the Storage Capacity. The Storage Capacity may have at least one of the following information elements.

1) A transmission-source eNB identifier and/or a destination eNB identifier.
2) The existence of a storage capacity that can be shared (YES/NO).
3) The size of a storage capacity that can be shared. The size may be expressed by an accurate numerical value, or may be expressed by a rough index.

It is noted that step S111 may be performed when the eNB 200-1 and the eNB 200-2 set a virtual storage area (Setup), or may be performed when the storage capacity of the eNB 200-2 is updated.

In step S112, the eNB 200-1 transmits, to the eNB 200-2, a "Storage Addition/Modification/Remove Request" for requesting an addition of the shared storage capacity (Storage Addition), a modification of the shared storage capacity (Storage Modification), or a removal of the shared storage capacity (Storage Remove).

The Storage Addition Request may have at least one of the following information elements.

1) A transmission-source eNB identifier and/or a destination eNB identifier, a transaction identifier.
2) A list of GTP tunnel endpoints (TEs) of the transmission-source eNB. Each entry in the list may include a TNL address and a GTP TE ID.
3) A list of the identification information (the IP address, the URL, or the like) of the content data requested for addition. The eNB 200 having received the IE acquires the requested content data from the server 600 and stores the content data.

The Storage Modification Request may have at least one of the following information elements in addition to the information elements included in the Storage Addition Request.

1) A list of GTP tunnel endpoints (TEs) of the transmission-source eNB to be modified or removed. Each entry in the list may include a TNL address and a GTP TE ID.

2) A list of the identification information (the IP address, the URL, or the like) of the content data to be modified or removed.

In step S113, the eNB 200-2 transmits, to the eNB 200-1, an ACK (acknowledgment) or a NACK (negative acknowledgment) to the Storage Addition/Modification/Remove Request. The ACK to the Storage Addition Request may include a list of identification information (an IP address, a URL, or the like) of the content data stored in the eNB 200-2.

Second Embodiment

A second embodiment will be described while focusing on a difference from the first embodiment, below.

In the second embodiment, a new network apparatus (New entity) different from the eNB 200 executes each function of the "Aware Entity", the "Storage entity", the "Predict entity", and the "Control entity" described above. The new network apparatus is provided in the RAN (E-UTRAN 10). Specifically, the new network apparatus is provided on the data path between the eNB 200-1 and the EPC 20 (S-GW 300U). Hereinafter, such a new network apparatus will be called a U-plane gateway (UPGW).

FIG. 8 is a diagram illustrating a configuration of a UPGW 500 according to the second embodiment. As illustrated in FIG. 8, the UPGW 500 includes a controller 510, a network communication unit 520, and a storage 530.

The controller 510 performs various types of controls in the UPGW 500. The controller 510 includes a processor and a memory. The memory stores a program executed by the processor, and information used for a process by the processor. The processor includes a CPU (Central Processing Unit) configured to run a program stored in the memory to execute various types of processes. The processor executes various types of processes described later.

The network communication unit 520 is connected to the MME/S-GW 300 via a first network interface, and is connected to the eNB 200 via a second network interface. Hereinafter, the first network interface will be called a C1 interface, and the second network interface will be called a C2 interface. The second network interface may be an X2 interface. The network communication unit 520 is used in the communication performed on the C1 interface, the communication performed on the C2 interface, and the like.

The storage 530 stores the content data. The storage 530, in order to construct a virtual large-capacity storage similarly to the first embodiment, may be shared with the eNB 200 (and/or another UPGW 500).

The operation of the UPGW 500 is similar to the operation of the eNB 200 according to the first embodiment described above. Specifically, the UPGW 500 includes the storage 530 configured to store content data delivered from the server 600 outside the E-UTRAN 10, and the controller 510 configured to recognize content data requested by the UE 100, and to determine whether or not the requested content data is stored in the storage 530. If the requested content data is stored in the storage 530, the controller 510 delivers the requested content data to the UE 100 on behalf of the server 600. Further, the controller 510 recognizes the requested content data, based on the uplink data of the UE 100. If the requested content data is not stored in the storage 530, the controller 510 transfers uplink data to the EPC 20 (S-GW 300U).

Figure 9:
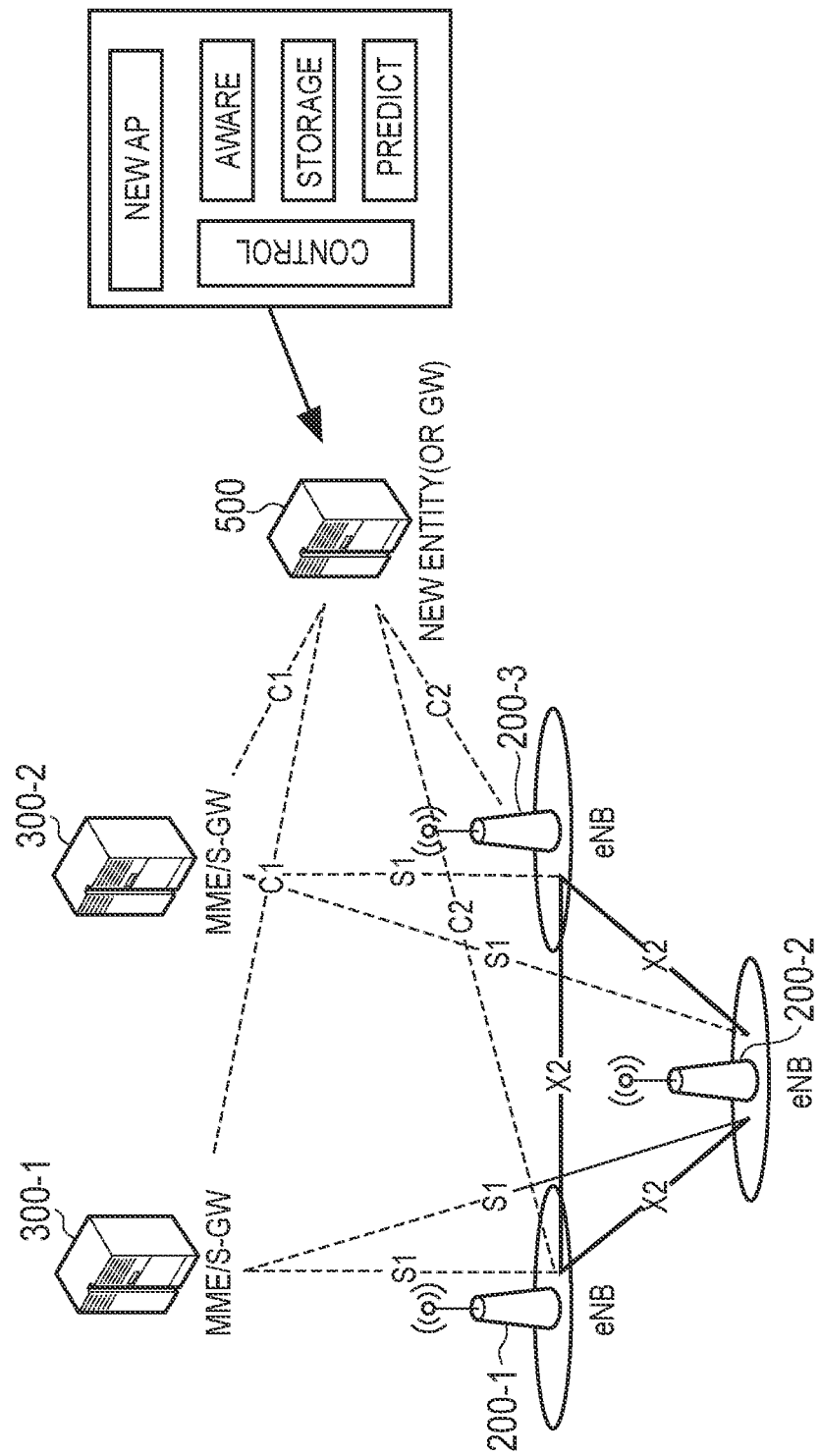
FIG. 9 is a diagram illustrating a function of the UPGW according to a second embodiment.

FIG. 9 is a diagram illustrating a function of the UPGW 500 according to the second embodiment. The function of the UPGW 500 illustrated in FIG. 9 is executed by the controller 510 (and the storage 530).

As illustrated in FIG. 9, the UPGW 500 includes a new Application Protocol (a New AP) for the C1 interface and the C2 Interface. The New AP executes each function of the "Aware Entity", the "Storage entity", the "Predict entity", and the "Control entity" described above.

In the second embodiment, the UPGW 500 (the controller 510) sets, with the eNB 200, a bidirectional data path of the uplink data and the downlink data of the UE 100, and sets, with the EPC 20 (S-GW 300U), a unidirectional data path of the uplink data of the UE 100. That is, the UPGW 500 may not set a data path of the downlink data of the UE 100 with the EPC 20 (S-GW 300U).

Figure 10:
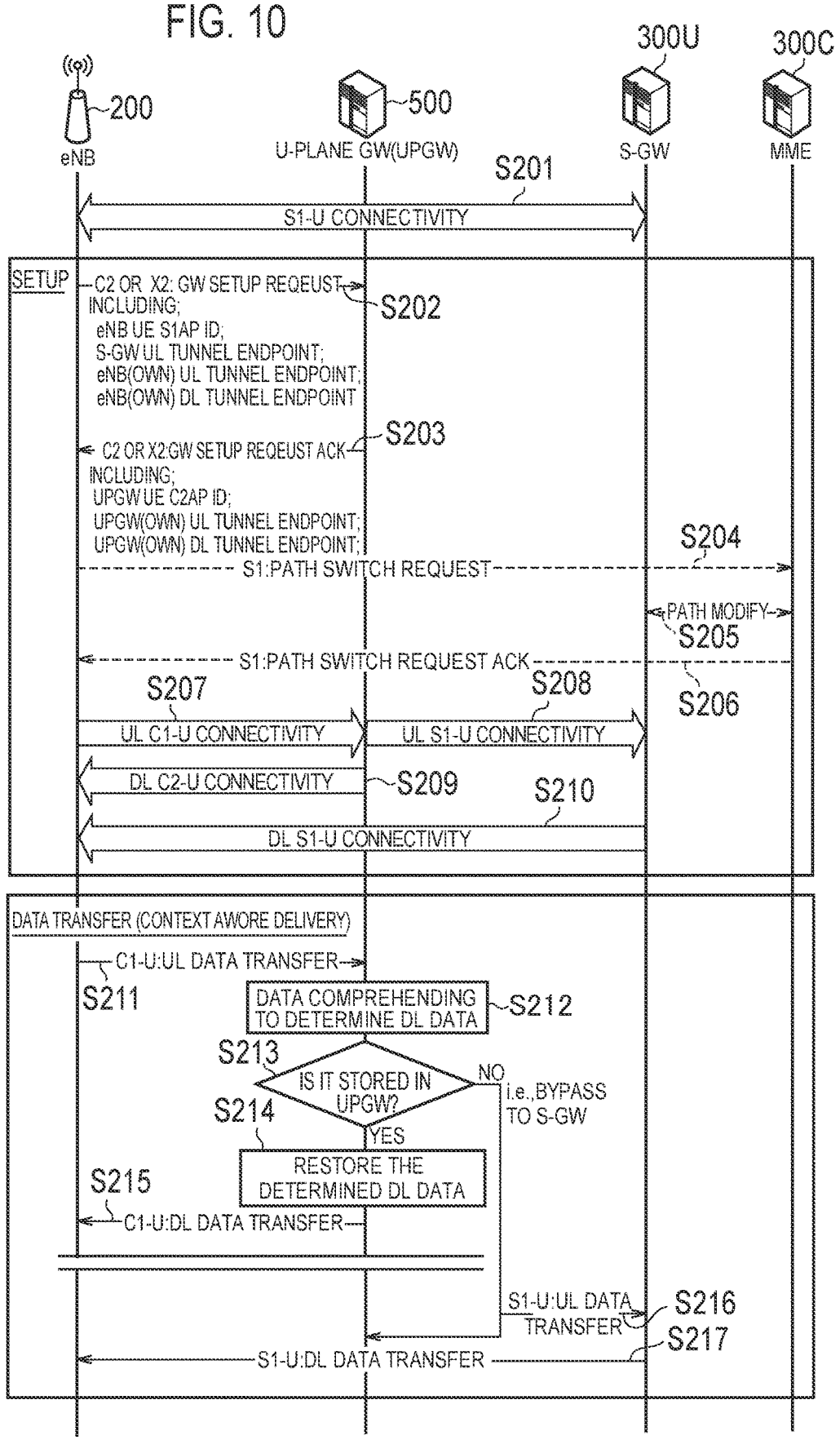
FIG. 10 is a diagram illustrating an operation sequence example according to the second embodiment.

FIG. 10 is a diagram illustrating an operation sequence example according to the second embodiment. The sequence includes a setup procedure concerning the UPGW 500 (the Setup procedure in step S202 through S210), and a delivery procedure of the content data (the "Data transfer" in step S211 through S217). Such a delivery procedure may be called "Context Aware Delivery". It is noted that in the example illustrated in FIG. 10, these procedures are procedures associated with a specific UE 100 (UE associated).

As illustrated in FIG. 10, in step S201, the eNB 200 has an S1-U connection with the S-GW 300U (S1-U Connectivity). The S1-U connection is an S1 connection in the U-plane. A "Connection in the U-plane" may be read as a "data path".

In step S202, the eNB 200 transmits, to the UPGW 500, a GW Setup Request for requesting the setup of the UPGW 500 on the C2 interface. The GW Setup Request includes an eNB UE S1AP ID, an S-GW UL Tunnel Endpoint ID, an eNB UL Tunnel Endpoint ID, and an eNB DL Tunnel Endpoint ID. The GW Setup Request may include an E-RAB ID. The eNB UE S1AP ID is an identifier of the UE 100 on the S1 interface. The S-GW UL Tunnel Endpoint ID is an identifier of the uplink data tunnel termination of the S-GW 300U. The eNB UL Tunnel Endpoint ID is an identifier of the uplink data tunnel termination of the eNB 200. The eNB DL Tunnel Endpoint ID is an identifier of the downlink data tunnel termination of the eNB 200. Here, two eNB DL Tunnel Endpoint IDs exist per E-RAB. One indicates the downlink data tunnel termination between the eNB 200 and the UPGW 500, and the other indicates the downlink data tunnel termination between the eNB 200 and the S-GW 300U.

In step S203, the UPGW 500 transmits, to the eNB 200, a GW Setup Request Ack that is an acknowledgement to the GW Setup Request on the C2 interface. The GW Setup Request Ack includes a UPGW UE C2AP ID, a UPGW UL Tunnel Endpoint ID, and a UPGW DL Tunnel Endpoint ID. The UPGW UE C2AP ID is an identifier of the UE 100 on the C2 interface. The UPGW UL Tunnel Endpoint ID is an identifier of the uplink data tunnel termination of the UPGW 500. Here, two UPGW UL Tunnel Endpoint IDs exist per E-RAB. One indicates the uplink data tunnel termination between the UPGW 500 and the eNB 200, and the other indicates the uplink data tunnel termination between the UPGW 500 and the S-GW 300U. The UPGW DL Tunnel Endpoint ID is an identifier of the downlink data tunnel termination of the UPGW 500.

In step S204, the eNB 200 transmits, to the MME 300C, a Path Switch Request on the S1 interface. The Path Switch Request includes an eNB UE S1AP ID, an E-RAB ID, an eNB DL Tunnel Endpoint ID for each E-RAB ID, and a UPGW UL Tunnel Endpoint ID for each E-RAB ID.

In step S205, the MME 300C transmits to and receives from the S-GW 300U a Path modify. The Path modify from the MME 300C to the S-GW 300U includes an information element included in the Path Switch Request (S204). The Path modify from the S-GW 300U to the MME 300C includes an information element included in the Path Switch Request Ack (S206).

In step S206, the MME 300C transmits, to the eNB 200, a Path Switch Request Ack on the S1 interface. The Path Switch Request Ack includes an MME UE S1AP ID, an E-RAB ID, an S-GW UL TE ID for each E-RAB ID, and an S-GW DL TE ID for each E-RAB ID.

In step S207, based on the eNB UL Tunnel Endpoint ID and the UPGW UL Tunnel Endpoint ID, a UL C1-U connection (UL C1-U connectivity) is set between the eNB 200 and the UPGW 500. The UL C1-U connection is a connection (data path) for uplink data in the C1 interface.

In step S208, based on the UPGW UL Tunnel Endpoint ID and the S-GW UL Tunnel Endpoint ID, a UL C1-U connection (UL C1-U connectivity) is set between the UPGW 500 and the S-GW 300U. The UL C1-U connection is a connection (data path) for uplink data in the C1 interface. Alternatively, the connection may be a virtual S1-U connection.

In step S209, based on the eNB DL Tunnel Endpoint ID and the UPGW DL Tunnel Endpoint ID, a DL C2-U connection (DL C2-U connectivity) is set between the eNB 200 and the UPGW 500. The DL C2-U connection is a connection (data path) for downlink data in the C2 interface.

In step S210, based on the eNB DL Tunnel Endpoint ID and the S-GW DL TE ID, a DL S1-U connection (DL S1-U connectivity) is set between the eNB 200 and the S-GW 300. The DL S1-U connection is a connection (data path) for downlink data in the S1 interface.

In step S211, eNB 200 transfers, to the UPGW 500, uplink data (UL data) transmitted from the UE 100 on the C1-U interface.

In step S212, the UPGW 500, based on the uplink data, recognizes the content data (DL data) requested from the UE 100 to the server 600, and determines whether or not the UPGW 500 has stored the requested content data.

If the UPGW 500 has not stored the requested content data (step S213: No), in step S216, the UPGW 500 transfers, to the S-GW 300U, the uplink data on the C1-U interface (or the virtual S1 connection). Thereafter, in step S217, the S-GW 300U forwards, to the eNB 200, the content data delivered from the server 600 on the S1-U interface.

On the other hand, if the UPGW 500 has stored the requested content data (step S213: Yes), in step S214, the UPGW 500 reads the requested content data. Thereafter, in step S215, the UPGW 500 forwards, to the eNB 200, the read content data on the C1-U interface.

Modification of Second Embodiment

In the second embodiment described above, a case in which a handover of the UE 100 is performed from a source eNB to a target eNB was not taken into consideration.

However, if a handover of the UE 100 is performed from a source eNB to a target eNB, the UPGW 500 (the controller 510) may receive a path switch request from the source eNB. The path switch request is transmitted and received on the C2 interface. The path switch request includes information about the target eNB (for example, the TE ID). The source eNB may, only if the source eNB has at least one UE-associated connection between the source eNB and the UPGW 500, transmit a path switch request to the UPGW 500. The UPGW 500 switches the data path (the C2-U connection) between the UPGW 500 and the eNB 200 from the source eNB to the target eNB, based on the information about the target eNB. In switching the data path, not only when the TE ID of the source eNB changes to the TE ID of the target eNB, but also when the TE ID at the UPGW side changes (when a change is necessary), the UP GW TE ID after change may be notified to the target eNB.

Thus, rather than requesting a path switch to the UPGW 500 via the MME 300C, a path switch is directly requested from the source eNB to the UPGW 500. As a result, it is possible to reduce the signaling, and thus reduce a control delay.

Third Embodiment

A third embodiment will be described while focusing on differences from the first and second embodiments, below. The third embodiment is an embodiment focusing on a TCP connection between a communication destination (the server 600) of the UE 100 and the UE 100.

Figure 11:
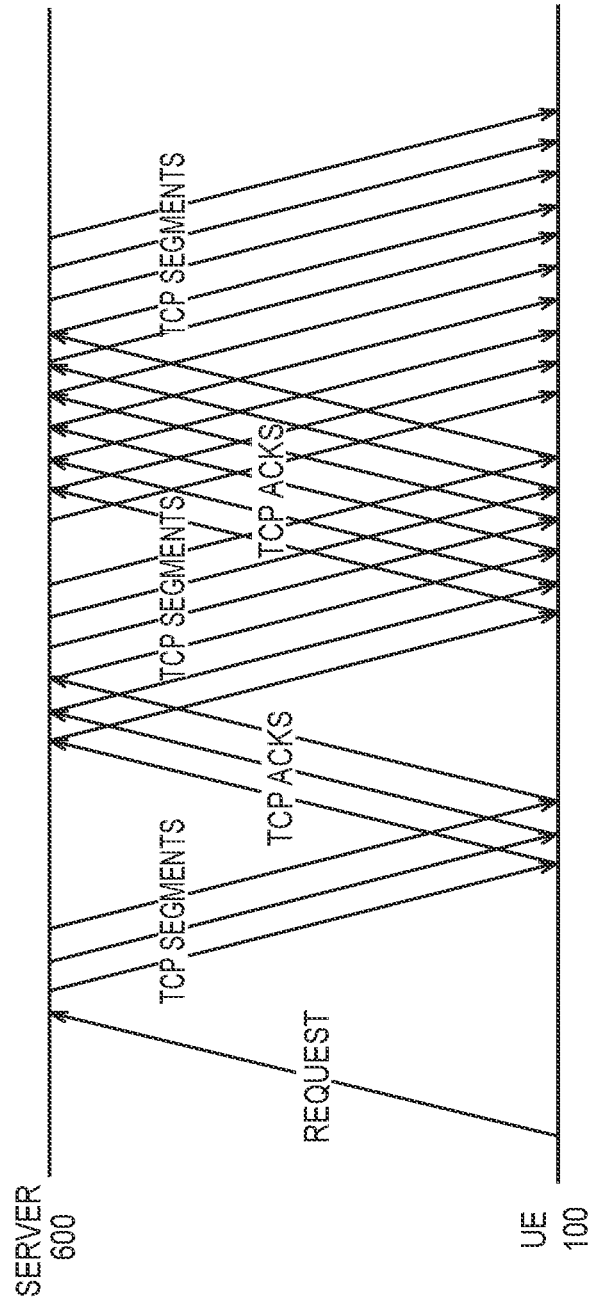
FIG. 11 is a diagram illustrating an overview of a TCP.

FIG. 11 is a diagram illustrating an overview of a TCP. The UE 100 performs TCP communication with the server 600 via the E-UTRAN 10.

As illustrated in FIG. 11, the server 600 determines a congestion state of the network, based on a "TCP ACK" from the UE 100. The server 600, in response to the reception of the TCP ACK, gradually increases a window size. The window size is an amount of a "TCP Segment" to be continuously transmitted without waiting for the "TCP ACK". On the other hand, if the server 600 fails to receive the "TCP ACK" (time out), the server 600 halves the window size. Such a control is called a "slow start". Thus, even if the downlink of the LTE system is not congested, it is not possible to improve a downlink TCP throughput unless the UE 100 quickly transmits the "TCP ACK" in the uplink. That is, if the delay time to up to the completion of the transmission of the "TCP ACK" to the server 600 can be shortened, it is possible to improve the downlink TCP throughput.

In the third embodiment, by increasing the RAN (E-UTRAN 10) in sophistication, the delay time (that is, latency) of data forwarding to the UE 100 is reduced. The network apparatus according to the third embodiment is provided in the RAN (E-UTRAN 10). In the third embodiment, the network apparatus is an eNB 200. However, the network apparatus may be the UPGW 500.

The eNB 200 according to the third embodiment includes a receiver (the network communication unit 240) configured to receive data transmitted from the communication destination (the server 600) of the UE 100, and the controller 230 configured to store the data and forward the stored data to the UE 100. The eNB 200 terminates a connection of a predetermined protocol between the UE 100 and the communication destination (the server 600). Even if the data forwarding is not complete, the controller 230 transmits a delivery acknowledgment response for the data to the communication destination on behalf of the UE 100. In the third embodiment, the predetermined protocol is a TCP, and the delivery acknowledgment response is a TCP ACK. However, the predetermined protocol may be a UDP, an RTP, or the like.

Figure 12:
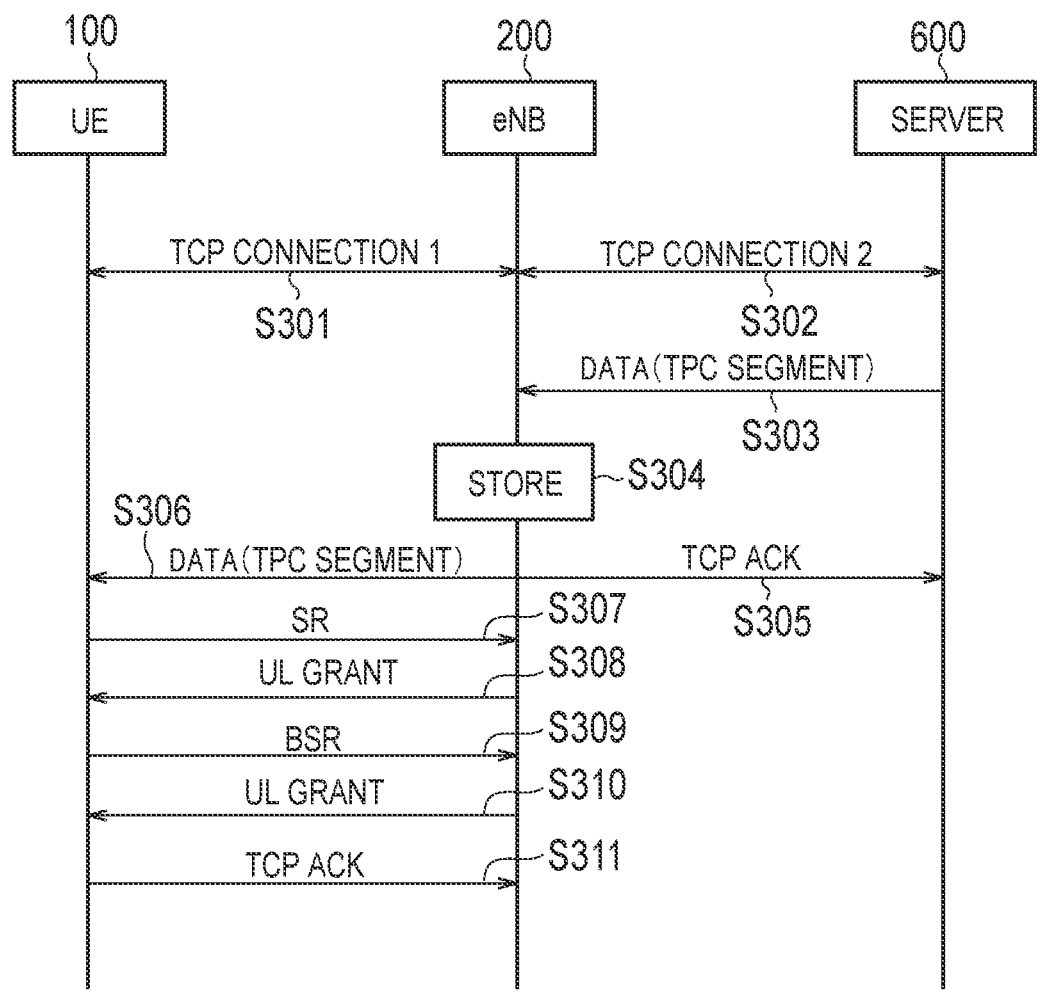
FIG. 12 is a diagram illustrating an operation sequence example according to a third embodiment.

FIG. 12 is a diagram illustrating an operation sequence example according to the third embodiment. The UE 100 performs TCP communication with the server 600 via the eNB 200.

As illustrated in FIG. 12, the eNB 200 terminates the TCP connection between the UE 100 and the server 600. Specifically, the eNB 200 sets a TCP connection 1 with the UE 100 (step S301), and sets a TCP connection 2 with the server 600 (step S302).

In step S303, the server 600 transmits, to the eNB 200, downlink data (a TCP segment) on the TCP connection 2.

In step S304, the eNB 200 stores the downlink data (the TCP segment) received from the server 600.

In step S305, the eNB 200 transmits, to the server 600, a TCP ACK on the TCP connection 2. The server 600, in response to the reception of the TCP ACK, increases a window size. It is noted that according to the conventional method, the server 600 cannot increase the window size unless the point of time is later than step S311 described later.

On the other hand, in steps S306 through S311, the eNB 200 performs communication with the UE 100 on the TCP connection 1. In step S306, while allocating a downlink radio resource to the UE 100, the eNB 200 transmits, to the UE 100, downlink data (a TCP segment) by using the downlink radio resource. The UE 100 is successful in receiving the downlink data (the TCP segment), and generates a TCP ACK. However, the UE 100, in a case of failing to receive the downlink data (the TCP segment), requests the eNB 200 to perform retransmission by an HARQ/ARQ.

In step S307, the UE 100 transmits, to the eNB 200, an SR (Scheduling Request) for requesting allocation of an uplink radio resource.

In step S308, the eNB 200 transmits, to the UE 100, in response to a reception of the SR, a "UL grant" for allocating the uplink radio resource.

In step S309, the UE 100 transmits, to the eNB 200, in response to a reception of the "UL grant", a BSR (Buffer Status Report) indicating the amount of data in a uplink buffer.

In step S310, the eNB 200 determines the amount of resources to be assigned based on the BSR, and transmits, to the UE 100, a "UL grant" for allocating the uplink radio resource.

In step S311, the UE 100 transmits, to the eNB 200, in response to the reception of the "UL grant", uplink data (TCP ACK).

The eNB 200 may, in response to a reception of the uplink data (TCP ACK), delete the stored downlink data. Alternatively, the eNB 200 may hold the downlink data over a predetermined period of time without deleting the stored downlink data. If the downlink data is held, the eNB 200 may perform an operation similar to that in the first embodiment described above. In a case of the TCP NACK, the eNB 200 may transmit again the stored TCP downlink data.

It is noted that an operation of the downlink was illustrated in FIG. 12, but the operation may be applied to the uplink as well.

Other Embodiments

In the embodiments described above, an example in which one eNB 200 shares the storage capacity with another eNB 200 was described. However, the eNB 200 may share the storage capacity with the UPGW 500. In addition, one UPGW 500 may share the storage capacity with another UPGW 500. Thus, in FIG. 6 and FIG. 7, at least one the eNBs 200 may be read as the UPGW 500.

In the first embodiment described above, the eNB 200 included an Aware entity, a Storage entity, and a Predict entity. In the second embodiment, the UPGW 500 included an Aware entity, a Storage entity, and a Predict entity. However, the entities may be distributed among a plurality of devices. For example, some of the Aware entity, the Storage entity, and the Predict entity may be included in the eNB 200, and the remaining entities may be included in the UPGW 500. Alternatively, some of the entities may be included in the UE 100. For example, a distributed arrangement where the UE 100 includes the Aware entity, the UPGW 500 includes the Storage entity, and the eNB 200 includes the Predict entity may be provided.

In the embodiments described above, an example where the network apparatus provided in the radio access network (E-UTRAN 10) is the eNB 200 or the UPGW 500 is described. However, the network apparatus according to the embodiments is not limited to the eNB 200 or the UPGW 500. The network apparatus according to the embodiment may be a relay node (RN). The RN is a relay device connecting wirelessly to the eNB 200, and configured to provide the function of the eNB 200 to the UE 100. The RN may be a movable RN (the so-called mobile relay).

The embodiments described above may be implemented independently; or two or more embodiments may be combined and implemented. For example, a part of the configuration according to one embodiment may be added to another embodiment. Alternatively, a part of the configuration according to one embodiment may be replaced by a part of a configuration of another embodiment.

In the embodiments described above, the LTE system was exemplified as the mobile communication system. However, the present disclosure is not limited to the LTE system. The present disclosure may be applied to systems other than the LTE system.

INDUSTRIAL APPLICABILITY

The present disclosure is useful in the field of communication.

The invention claimed is:
1. A network apparatus provided in a radio access network of a mobile communication system, comprising:
  a storage configured to store content data delivered from a server outside the radio access network; and
  a controller configured to recognize content data requested by a radio terminal, and to determine whether or not the requested content data is stored in the storage, wherein
  the controller is configured to, when the requested content data is stored in the storage, deliver the requested content data to the radio terminal on behalf of the server,
  the network apparatus shares a storage capacity with another network apparatus provided in the radio access network,
  the controller is configured to exchange information on the storage, via a network interface with the another network apparatus, with the other network apparatus, and
  the controller is configured to request at least one of an addition of a shared storage capacity, a modification of a shared storage capacity, and a removal of a shared storage capacity to the another network apparatus.

* * * * *